United States Patent
Matsushima (10) Patent No.: US 7,510,275 B2
(45) Date of Patent: Mar. 31, 2009

(54) IMAGE FORMING APPARATUS AND IMAGE FORMING METHOD

(75) Inventor: Yuki Matsushima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 226 days.

(21) Appl. No.: 11/520,953

(22) Filed: Sep. 13, 2006

(65) Prior Publication Data

US 2007/0064250 A1    Mar. 22, 2007

(30) Foreign Application Priority Data

Sep. 16, 2005  (JP) .............................. 2005-270482
Aug. 29, 2006  (JP) .............................. 2006-232839

(51) Int. Cl.
  *G01D 11/00*  (2006.01)
(52) U.S. Cl. .............................. 347/100; 347/6; 358/1.9
(58) Field of Classification Search .................. 347/100
See application file for complete search history.

(56) References Cited

U.S. PATENT DOCUMENTS

| 6,873,729 | B2 | 2/2002 | Matsushima et al. |
| 7,006,692 | B2 | 2/2006 | Matsushima et al. |
| 7,034,878 | B2 | 4/2006 | Matsushima et al. |
| 2003/0020974 | A1 | 1/2003 | Matsushima et al. |
| 2003/0038870 | A1* | 2/2003 | Shimada ...................... 347/100 |
| 2003/0099407 | A1 | 5/2003 | Matsushima et al. |
| 2003/0103093 | A1* | 6/2003 | Vanhooydonck ............. 346/43 |
| 2004/0126009 | A1 | 7/2004 | Takenaka et al. |

FOREIGN PATENT DOCUMENTS

| JP | 10-324002 | 12/1998 |
| JP | 3391240 | 5/1999 |
| JP | 2001-318499 | 11/2001 |
| JP | 2002-072572 | 3/2002 |
| JP | 2002-139867 | 5/2002 |
| JP | 2006-157107 | 6/2006 |

* cited by examiner

*Primary Examiner*—Luu Matthew
*Assistant Examiner*—Brian J Goldberg
(74) *Attorney, Agent, or Firm*—Blakely, Sokoloff, Taylor & Zafman LLP (57) ABSTRACT

A disclosed image forming apparatus includes: an input unit to input image data; a conversion unit to convert the image data to conversion data on a plurality of colors for forming an image on a recording medium; and an image forming unit to form an image of the conversion data on a recording medium using a plurality of colors of coloring materials. The image is formed on the recording medium by the image forming unit using at least three types of black coloring materials having transparency and density different to one another in accordance with the conversion data on a black color upon conversion to the conversion data on plural colors.

9 Claims, 11 Drawing Sheets

|  | AMOUNT OF WHITE AGENT | AMOUNT OF COLORING AGENT |
|---|---|---|
| LK1 | LARGE | SMALL |
| LK2 | MIDDLE | MIDDLE |
| LK3 | SMALL | LARGE |

IMAGE FORMING APPARATUS AND IMAGE FORMING METHOD

PRIORITY

The present application is based on and claims priority to Japanese priority application No. 2005-270482 filed Sep. 16, 2005, No. 2006-232839 filed Aug. 29, 2006, the entire contents of which are hereby incorporated herein by reference.

BACKGROUND OF THE INVENTION

1. Field of the Invention

This invention relates to an image forming apparatus and an image forming method for performing image forming such as digital color copying machines, color laser printers, and ink-jet printers in which a coloring material such as toner, ink, or the like is used.

2. Description of the Related Art

In the field of image forming apparatuses using an electrophotographic method or an ink-jet method, there have been proposed image forming apparatuses for forming an image on a recording medium such as paper or an OHP sheet using dark and light coloring materials. In such image forming apparatuses, the quality of images formed on the recording medium greatly varies depending on how the density of the light coloring material is set.

In general, when the density of the light coloring material is reduced, although granularity of gradation expressed using only the light coloring material is improved, a range of gradation expressed using only the light coloring material is narrowed. Also, a difference of density between the dark and light coloring materials is increased, so that the granularity of gradation expressed using both of the dark and light coloring materials is deteriorated.

On the other hand, when the density of the light coloring material is increased, the range of gradation expressed using only the light coloring material is increased. Further, by reducing the difference of density between the dark and light coloring materials, although the granularity of gradation expressed using both of the dark and light coloring materials is improved, the granularity of gradation expressed using only the light coloring material is deteriorated in comparison with the case where the density of the light coloring material is low.

In other words, in order to obtain an image with a good granularity in an entire range of gradation, it is necessary to set the density of the light coloring material to be optimal. In practice, the density of the coloring material is preferably set to be close to that of an output image. In this case, the good granularity refers to a status of an image recorded on a recording medium where surface roughness of dots is difficult to recognize.

Conventionally, in order to solve such a problem, there have been known several techniques for securing granularity in a highlight of an image and achieving a dynamic range in a shadow of the image (see Japanese Patent No. 3391240, Japanese Laid-Open Patent Application No. 2002-139867, and Japanese Laid-Open Patent Application No. 2001-318499).

Japanese Patent No. 3391240 discloses a technique for securing granularity in the highlight of the image and achieving the dynamic range in the shadow of the image by using more than two types of ink with a different density.

On the other hand, there are substantially two types of light toner. One is a non-transparent type in which a white agent such as titanium oxide is mixed (see Japanese Laid-Open Patent Application No. 2002-139867, for example), and the other is a transparent type in which pigment is diluted (see Japanese Laid-Open Patent Application No. 2001-318499, for example).

The non-transparent type light toner is characteristic in that density thereof is saturated when an amount of attachment is increased. Japanese Laid-Open Patent Application No. 2002-139867 discloses a grounding effect, as an example, for concealing a status of a recording medium such as color, surface smoothness, and the like based on the above-mentioned characteristics. In accordance with this, granularity in a highlight of an image is obtained and a dynamic range in a shadow of the image is achieved by disposing the light toner with a low transparency at a bottom layer.

However, taking into consideration the grounding effect, it is preferable to have a high area ratio of the light coloring material and a low density of the coloring material. However, if the density of the light coloring material is low, the quality of an image is degraded as mentioned above. Further, as the density of an output image is increased, the density of the light coloring material is saturated at an early stage, so that gradation may be discontinuous at the beginning of a coloring agent of K (black) in image forming.

SUMMARY OF THE INVENTION

An image forming apparatus and image forming method are described. In one embodiment, an image forming apparatus comprises: an input unit to input image data; a conversion unit to convert the image data to conversion data on a plurality of colors for forming an image on a recording medium; and an image forming unit to form an image of the conversion data on a recording medium using a plurality of colors of coloring materials, wherein the image is formed on the recording medium by the image forming unit using at least three types of black coloring materials having transparency and density different to one another in accordance with the conversion data on a black color upon conversion to the conversion data on plural colors.

DETAILED DESCRIPTION OF THE PREFERRED EMBODIMENTS

The present invention provides an improved and useful image forming apparatus and image forming method in which the above-mentioned problems are eliminated.

Embodiments of the present invention include an image forming apparatus and image forming method that can output an image with a good granularity in the entire range of gradation upon forming the image using dark and light coloring materials regardless of a status of a recording medium.

According to one embodiment of the present invention, an image forming apparatus comprises: an input unit to input image data; a conversion unit to convert the image data to conversion data on a plurality of colors for forming an image on a recording medium; and an image forming unit to form an image of the conversion data on a recording medium using a plurality of colors of coloring materials, wherein the image is formed on the recording medium by the image forming unit using at least three types of black coloring materials having transparency and density different to one another in accordance with the conversion data on a black color upon conversion to the conversion data on plural colors.

According to another embodiment of the present invention, transparency of the black coloring materials is lower as density of the black coloring materials is lower.

According to another embodiment of the present invention, a level of transparency is similar between the black coloring materials having least difference of density.

According to another embodiment of the present invention, the image forming unit records a coloring material having a lower transparency at a bottom layer on the recording medium.

According to another embodiment of the present invention, the conversion unit uses a coloring material having a low transparency and density for a highlight portion of an image and switches to a coloring material having a high transparency and density as a shadow portion of the image increases.

Another embodiment of the present invention include an image forming method comprising: inputting image data; converting the image data to conversion data on a plurality of colors for forming an image on a recording medium; and forming an image of the conversion data on a recording medium using a plurality of colors of coloring materials, wherein the image is formed on the recording medium using at least three types of black coloring materials having transparency and density different to one another in accordance with the conversion data on a black color upon conversion to the conversion data on plural colors.

According to another embodiment of the present invention, transparency of the black coloring materials is lower as density of the black coloring materials is lower.

According to another embodiment of the present invention, a level of transparency is similar between the black coloring materials having least difference of density.

According to another embodiment of the present invention, a coloring material having a lower transparency is used for image forming at a bottom layer on the recording medium.

According to another embodiment of the present invention, the steps include: performing conversion to conversion data on plural colors so as to use a coloring material having a low transparency and density for a highlight portion of an image and to use a coloring material having a high transparency and density as a shadow portion of the image increases.

According to embodiments of the present invention, with the image forming apparatus and image forming method, an image is formed using at least three types of coloring materials of the same color having a different transparency to one another, so that it is possible to obtain an image with a good granularity in an entire range of gradation upon forming the image using dark and light coloring materials regardless of a status of a recording medium.

Other features and advantage of the present invention will become more apparent from the following detailed description when read in conjunction with the accompanying drawings.

Figure 1:
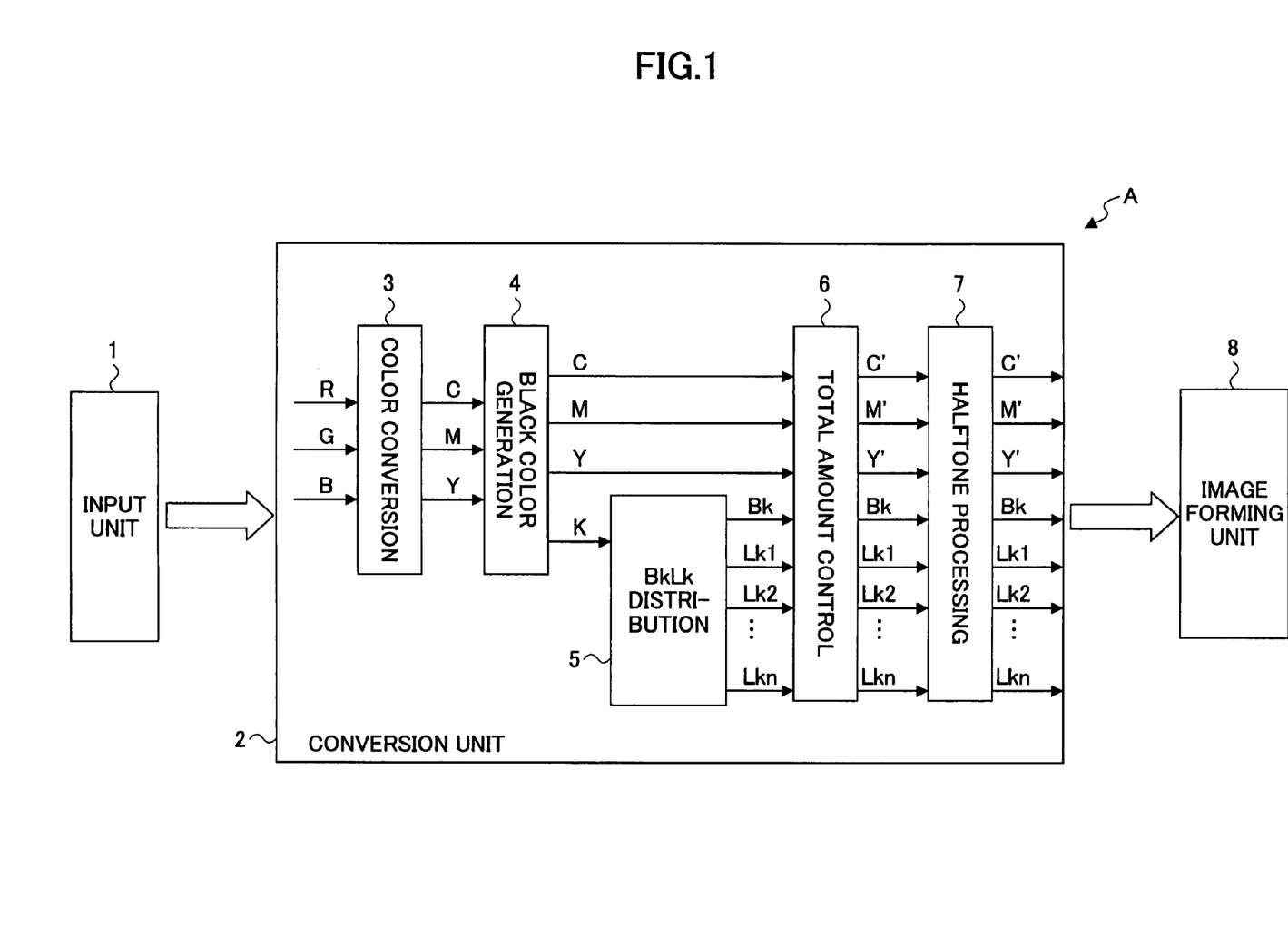
FIG. 1 is a schematic diagram describing image processing according to the present invention.

In the following, embodiments of the present invention will be described with reference to the accompanying drawings. FIG. 1 is a schematic diagram describing image processing according to the present invention.

Figure 18:
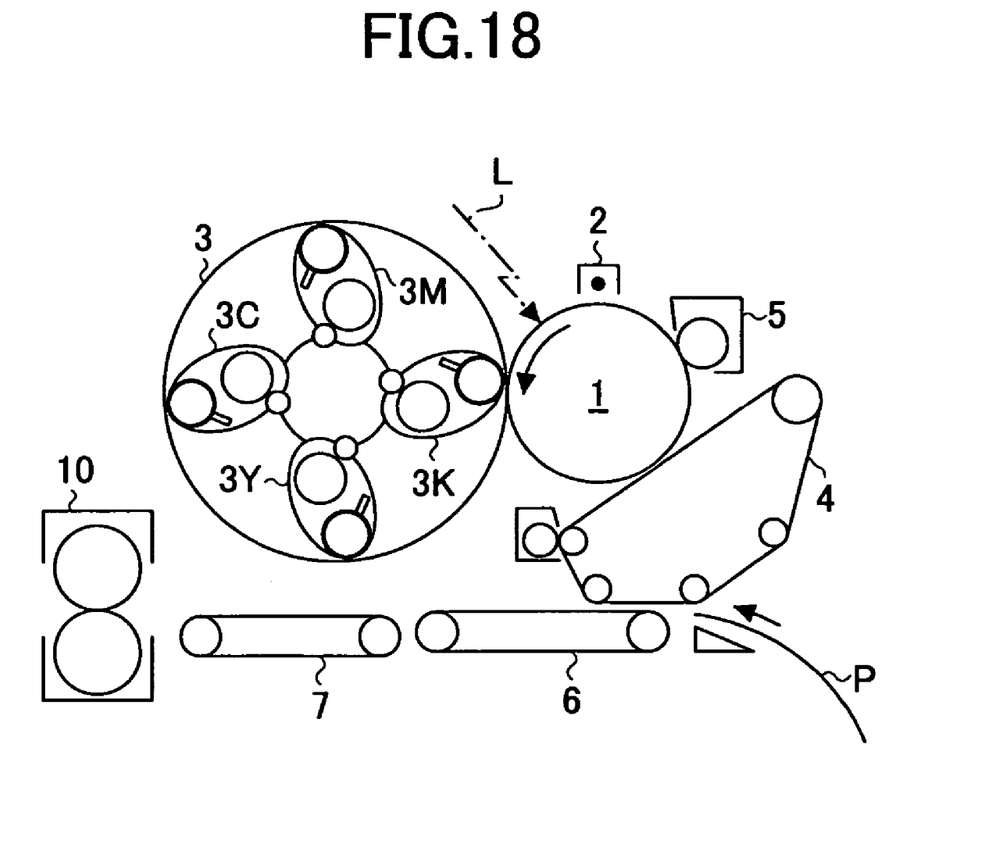
FIG. 18 is a schematic diagram showing the vicinity of an image creating unit in an example of an image forming apparatus to which the present invention is applied.

FIG. 18 is a schematic diagram showing the vicinity of an image creating unit in an example of an image forming apparatus to which the present invention is applied. As shown in this figure, in the periphery of a photoconductor drum (image carrier) 1, there are disposed an electrification unit 2 electrifying a surface of the photoconductor drum, a development device 3 providing electrified toner to a latent image on the surface of the photoconductor drum, an intermediate transfer belt 4 used as a intermediate transfer body, a cleaning device 5 removing/collecting residual toner on the photoconductor drum, and the like. Although the electrification unit 2 employs a charger type such as corotron, scorotron, or the like in an example shown in the figure, the electrification unit 2 may employ a contact-type electrification unit such as an electrification roller or the like. A space between the electrification unit 2 and the development device 3 is used as an exposure position, on which a scanning light is irradiated from an exposure device, which is not shown in the drawings, in order to form a latent image on the surface of the uniformly charged photoconductor. The development device 3 in this example is what is called a revolver type development device and includes development units 3K, 3Y, 3C, and 3M for black (K), yellow (Y), cyan (C), and magenta (M) toner. Upon forming a full-color image, the development units for each color alternately move to a development position facing the photoconductor drum and perform development. In addition, the development units for each color may be arranged on the periphery of the photoconductor drum 1. Further, the development device may use either a one-component method or a two-component method.

The intermediate transfer belt 4 is installed among plural rollers and includes a primary transfer unit (not shown in the drawings) transferring a toner image formed on the photoconductor drum 1 to the intermediate transfer belt 4. Below the intermediate transfer belt 4, there is disposed a secondary transfer unit 6 transferring the toner image carried on the intermediate transfer belt 4 to recording paper P.

In a lateral direction of the transfer conveying belt device 6 used as the secondary transfer unit, there is disposed a fixing device 10 fixing the unfixed toner transferred on the recording paper P. The transfer conveying belt device 6 is communicated with the fixing device 10 via a conveying belt 7.

In the following, an image forming operation according to the structure as mentioned above is briefly described.

When an image is formed, the surface of the photoconductor drum 1 is uniformly charged to a predetermined potential using the electrification unit 2. An exposure light L (laser beam, for example) from an exposure device not shown in the drawings is irradiated onto the photoconductor drum 1 charged using the electrification unit 2 and an electrostatic latent image is formed in accordance with image information. The electrostatic latent image is provided with toner from the development device 3 and a toner image is formed. Toner images of each color formed on the photoconductor drum 1 are successively transferred on the intermediate transfer belt 4 and superposed. Toner remaining on the photoconductor drum 1 is removed using the cleaning device 5 and residual potential on the drum is removed using an electricity removing device not shown in the drawings.

On the other hand, the recording paper P conveyed from a paper feed unit not shown in the drawings is moved to a secondary transfer nip, and the toner images carried on the intermediate transfer belt 4 are collectively transferred on the recording paper P using a transfer voltage in the transfer conveying belt device 6. The recording paper P to which unfixed toner images are placed are provided with heat and pressure when passing through the fixing device 10 and the toner images are fixed on the recording paper P.

FIG. 1 shows a flow of image processing for image forming in the image forming apparatus such as a printer shown in FIG. 18 in which dark and light coloring materials are used for K (black) printing.

In FIG. 1, RGB image data is input to an input unit 1. The RGB image data input from the input unit 1 is converted to CMYK image data in a conversion unit 2. The conversion unit 2 includes a color conversion unit 3 converting the RGB image data output from the input unit 1 to CMY image data, a black color generating unit 4 converting the CMY image data output from the color conversion unit 3 to the CMYK image data, a BkLk distribution unit 5 distributing the K image data generated in the black color generating unit 4 to dark and light image data using a distribution table (hereafter referred to as Lk1, Lk2 ... Lkn (n≧3) successively from the lightest K printing to the darkest K printing), a total amount control unit 6 controlling a total amount of coloring materials on the assumption that a maximum value of usage of each color material in the image data is represented as 100% of pixel density, the image data being output from the black color generating unit 4 and the BkLk distribution unit 5, and that a value of the total amount of color materials is obtained by multiplying the pixel density by the number of colors and a value not more than the obtained total amount value is used as an upper limit value so as to control the total amount of coloring materials, and a halftone processing unit 7 performing pseudo-halftone processing such as known error diffusion method, dithering method, and the like on the image data output from the total amount control unit 6. Then, based on the image data (C', M', Y', Lk1, Lk2 ... Lkn data) output from the conversion unit 2, image forming is performed on a recording medium in a recording unit 8.

In the following, types of light coloring materials (coloring material for Lk printing) are described. As described above, light coloring materials have a transparent (transparency) type and a non-transparent (non-transparency) type. In this case, the transparent type light coloring material is manufactured by reducing an amount of a coloring agent (black pigment such as carbon, for example) for a dark coloring material. By contrast, the non-transparent light coloring material is manufactured by mixing a coloring agent of the dark coloring material with a white agent (titanium oxide, for example)

Figure 2:
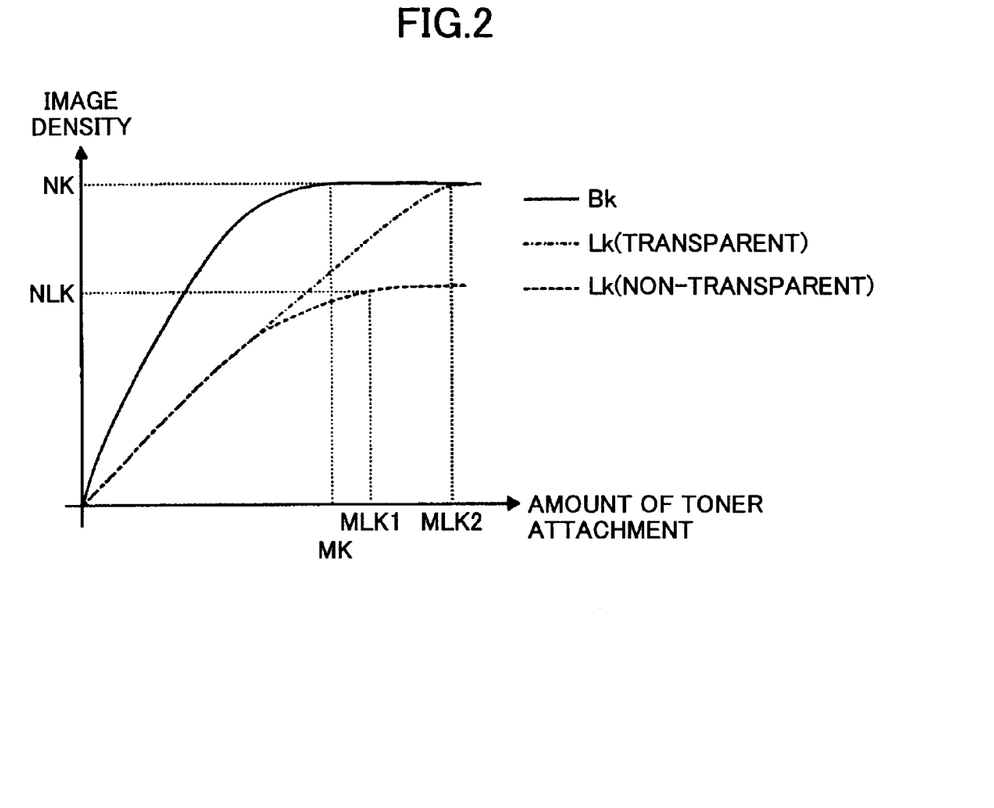
FIG. 2 is a diagram showing a relationship between an image density and an amount of attachment of a dark coloring material (Bk) and a light coloring material (Lk)

FIG. 2 is a diagram showing a relationship between an image density and an amount of attachment of the dark coloring material (Bk) and the light coloring material (Lk). In the figure, the density of the non-transparent type light coloring material Lk (non-transparency) is saturated (NLk) at an earlier stage of attachment (MLk1) in comparison with other coloring material Bk or the transparent type coloring material Lk (transparency).

On the other hand, the density of the transparent type light coloring material Lk (transparency) is not readily saturated when the amount of attachment of the coloring material is increased in comparison with the non-transparent type light coloring material Lk (non-transparency) and the density is saturated at about a saturation density of the dark coloring material (Nk). In other wards, with the non-transparent type light coloring material, a grounding effect is expected while the density is saturated. And, with the transparent type light coloring material, a high density of an image is expected by increasing a layer thickness (amount of attachment).

In this case, although FIG. 2 shows the density (density upon saturated density) of the non-transparent type light coloring material as NLK, it is possible to control the density by adjusting the amount of the coloring agent in the coloring material and the white agent.

Figure 3:
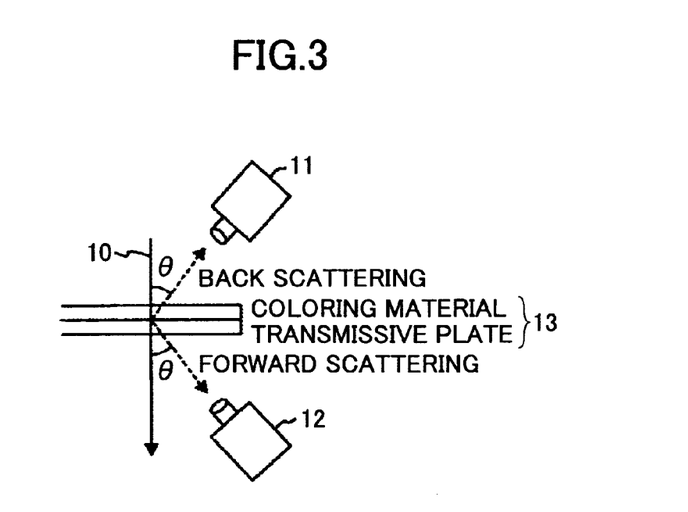
FIG. 3 is a schematic diagram showing an example of a method for measuring forward scattering and backscattering.

FIG. 3 is a schematic diagram showing an example of a method for measuring forward scattering and backscattering. In the following, transparency and non-transparency are described in terms of a "degree of transparency". The "degree of transparency" refers to a ratio of "forward scattering" to "backscattering".

Although a structure shown in FIG. 3 does not directly relate to the present invention, a measuring method is described to describe the "degree of transparency". A measurement sample 13 includes a coloring material attached on a transmissive substrate such as an OHP sheet or a transparent film in which smoothing processing is provided to a surface thereof.

Optical receivers 11 and 12 for an incident light 10 are disposed in an acceptance angle θ direction shown in the figure. The optical receiver 12 receives a forward scattering component and the optical receiver 11 receives a backscattering component. The degree of transparency is defined with the following formula.

Transparency=intensity of forward scattering component/intensity of backscattering component  Formula (1):

The transparency used to determine transparency or non-transparency is chosen in accordance with the amount of the white agent and the coloring agent contained in the coloring material.

Figure 4:
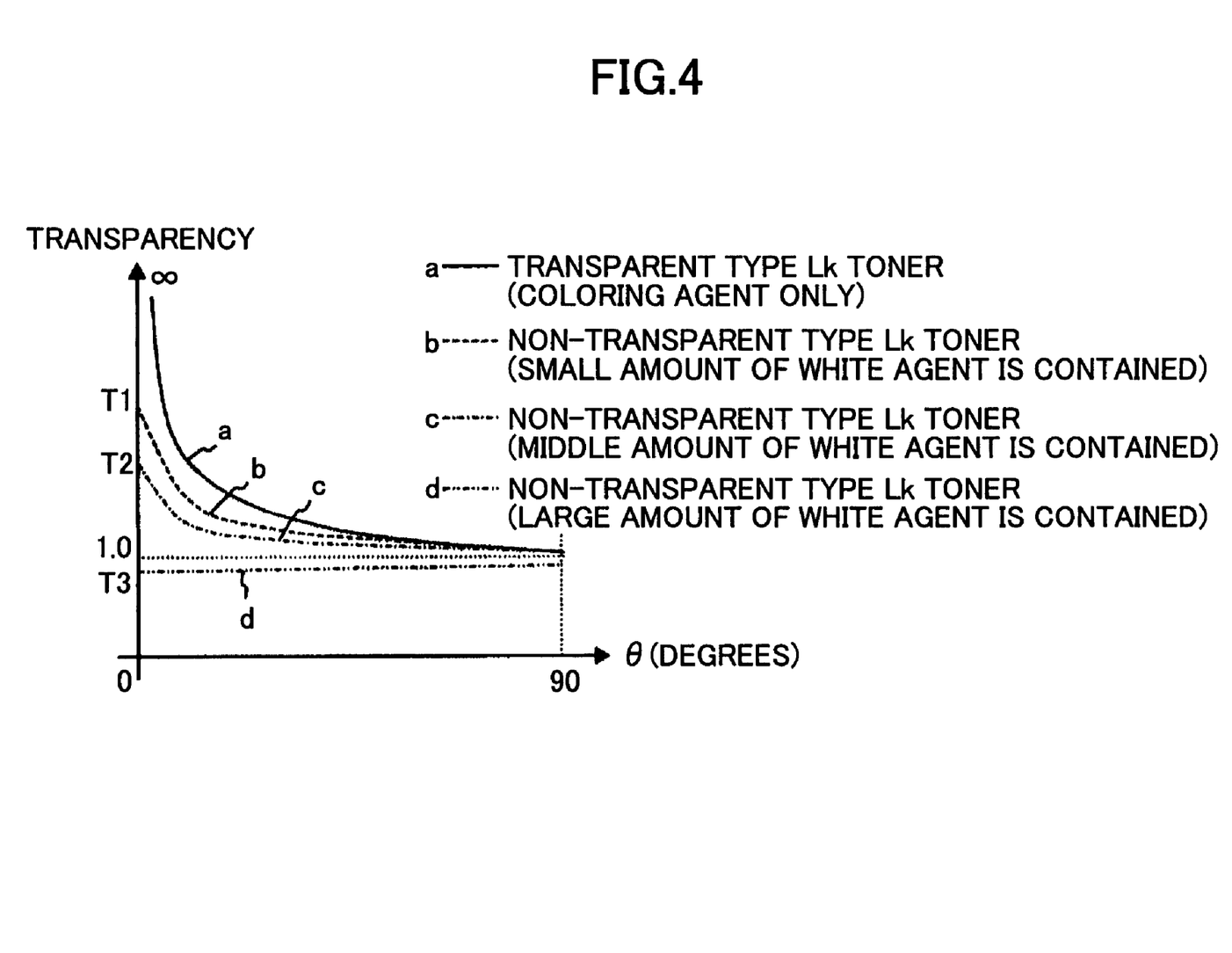
FIG. 4 is a diagram showing a relationship among an acceptance angle θ, transparency, and an amount of a white agent contained.

FIG. 4 is a diagram showing a relationship among the acceptance angle θ, transparency, and the amount of the white agent contained. In FIG. 4, a percentage of the coloring agent contained in the coloring materials is the same and a percentage of the white agent contained in the coloring materials is different. When the acceptance angle θ=0 (degree), the forward scattering component is a transmitted light component. As the acceptance angle θ becomes close to 90 degrees, an effect of the transmitted light is reduced and only those light reflected multiple times inside a layer of the coloring material and scattered light are received.

From FIG. 4, it is found that in a transparent type coloring material, transparency thereof changes from the infinity to close to 1 as the acceptance angle changes from 0 degree (transmitted light) to 90 degrees. On the other hand, in non-transparent coloring materials b, c, and d, transparency thereof does not become the infinity but has certain values (T1, T2, and T3) even when the acceptance angle is close to 0 degree (transmitted light). In this case, the amount of white agent contained in the coloring material is least in T1 and largest in T3.

In this manner, the transparency does not become the infinite when the acceptance angle is close to 0 degree since there are some components returning in an incident direction. Further, as the white agent is increased, the intensity of the backscattering exceeds that of the forward scattering in all acceptance angles as in T3 and the transparency becomes not more than 1. In other words, almost an entire incident light is not transmitted due to the white agent.

Figure 5:
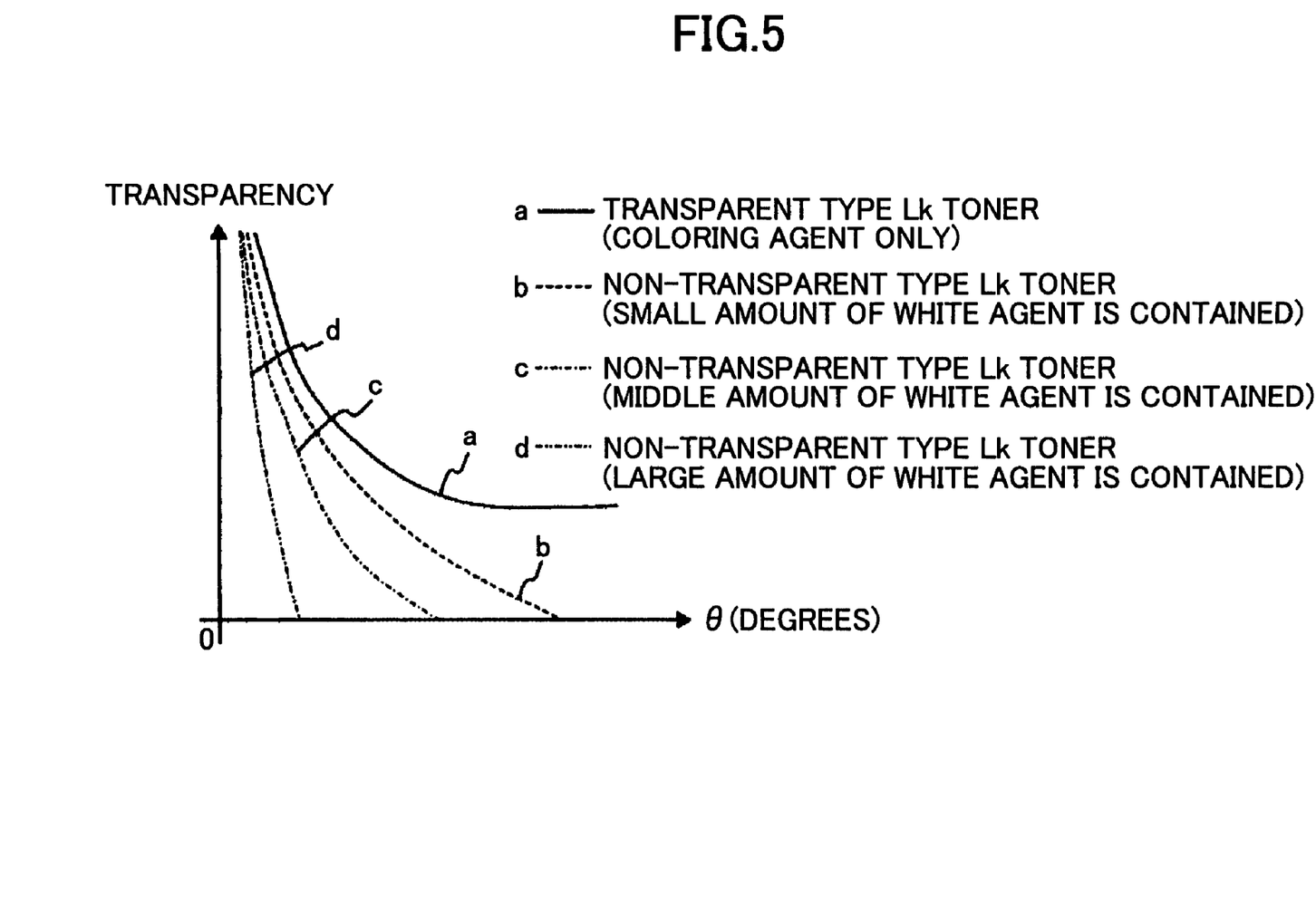
FIG. 5 is a diagram showing a relationship among an amount of attachment of a coloring material, transparency, and a white agent.

FIG. 5 is a diagram showing a relationship among the amount of attachment of the coloring material, transparency, and the white agent. The transparency of the non-transparent type coloring materials b, c, and d becomes 0 with a smaller amount of attachment in comparison with the transparent type coloring material a. Further, among the non-transparent coloring materials, the transparency of the coloring materials having a higher percentage of the white agent contained (d>c>b) becomes 0 with a smaller amount of attachment (M3<M2<M1). In other words, it is possible to control the density and transparency of the coloring material by adjusting the white agent contained in the coloring material.

Figure 6:
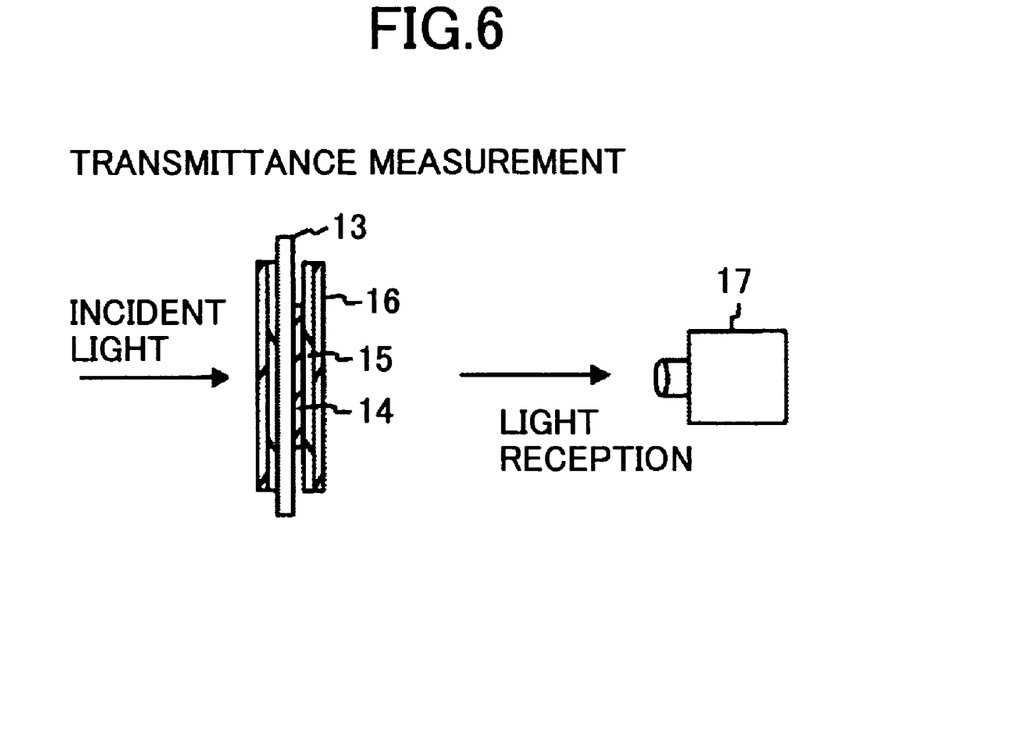
FIG. 6 is a schematic diagram illustrating transmittance measurement.

FIG. 6 is a schematic diagram describing a transmittance measurement. Usually, spectral transmittance of the sample 13 printed on an OHP sheet or the like is measured in order to evaluate the transparency. Although a structure of the transmittance measurement does not directly relate to the present invention, the transmittance measurement is described as a structure for measuring the spectral transmittance so as to evaluate the degree of transparency.

As shown in FIG. 6, an incident light passes through the OHP sheet 13, an ink layer 14, oil 15, and a cover glass 16 and is received using an optical receiver 17. In this case, if the transparency is high, the transmittance is high, and if the transparency is low, the transmittance is low.

Figure 7:
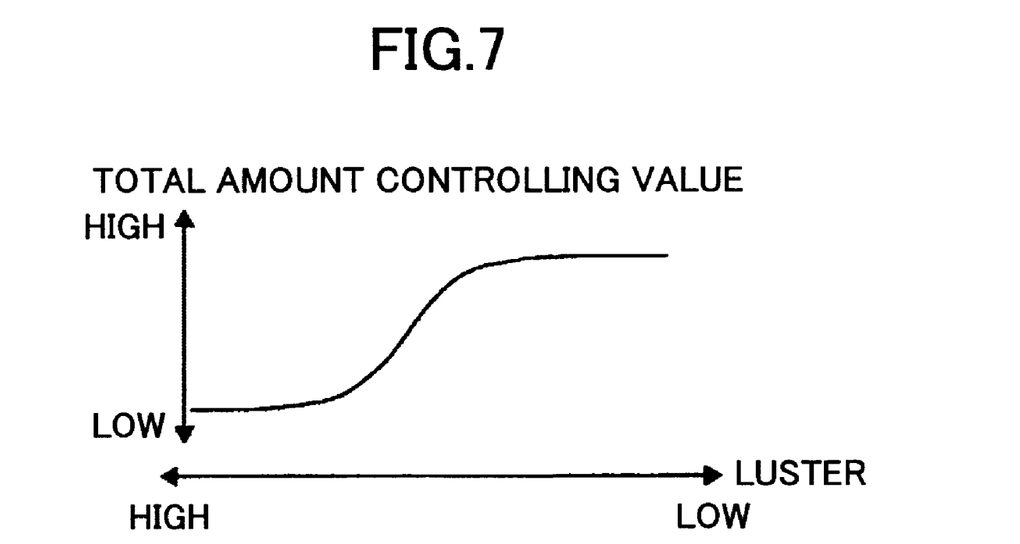
FIG. 7 is a diagram showing a relationship between a level of a total amount controlling value and luster.

FIG. 7 is a diagram showing a relationship between a level of a total amount controlling value and luster. In the following, distribution is described as a first embodiment of the present invention in which the total amount controlling value is 300% and three types of dark and light coloring materials are used.

In this case, the total amount controlling value represents a percentage at which superposition of coloring materials is possible. For example, a total amount controlling value of 300% indicates a maximum amount of superposed toner three times greater than the amount of a single type coloring material when it is superposed to 100%.

Figure 8:
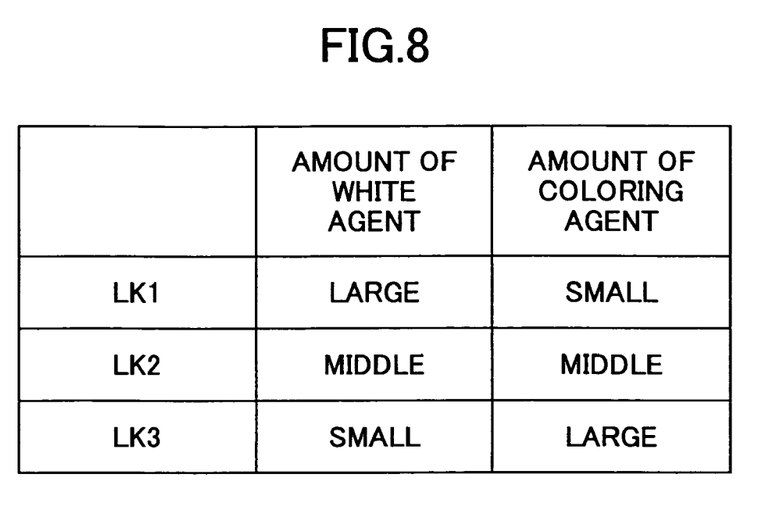
FIG. 8 is a table showing a relationship between an amount of a white agent and an amount of a coloring agent contained in each coloring material.
Figure 9:
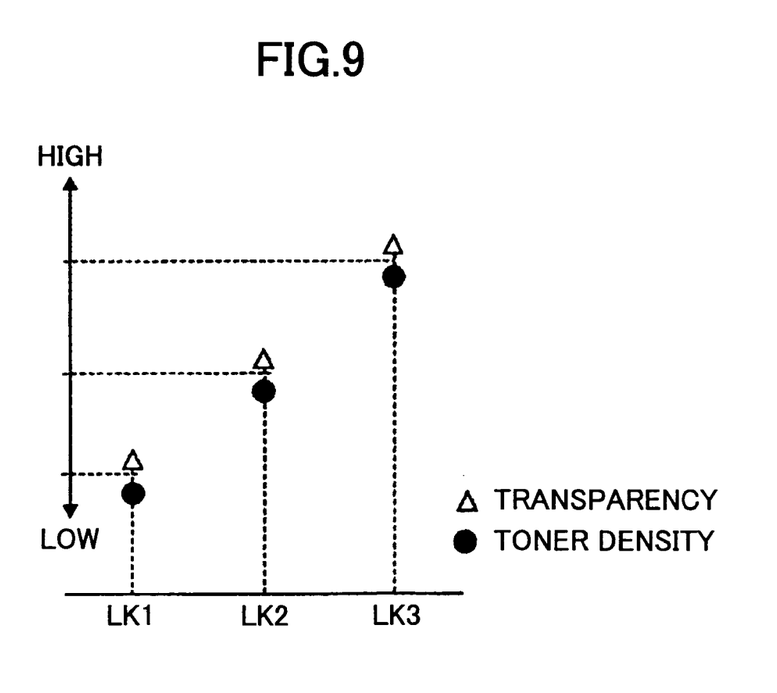
FIG. 9 is a diagram showing a relationship between transparency and density of each coloring material.

FIG. 8 is a diagram showing a relationship between the white agent and the coloring agent contained in each coloring material. FIG. 9 is a diagram showing a relationship between the transparency and the density of the coloring material. In this case, the three types of coloring materials are represented as Lk1, Lk2, and Lk3 from the lightest (brightest) coloring material (Lk1, Lk2 . . . Lkn (n≧3) are determined successively from the lightest K printing to the darkest K printing). Further, FIG. 8 shows a relationship between the white agent and the amount of the coloring agent contained in each coloring material Lk1, Lk2, and Lk3 and FIG. 9 shows a relationship between the transparency and the density of the coloring material.

Figure 10:
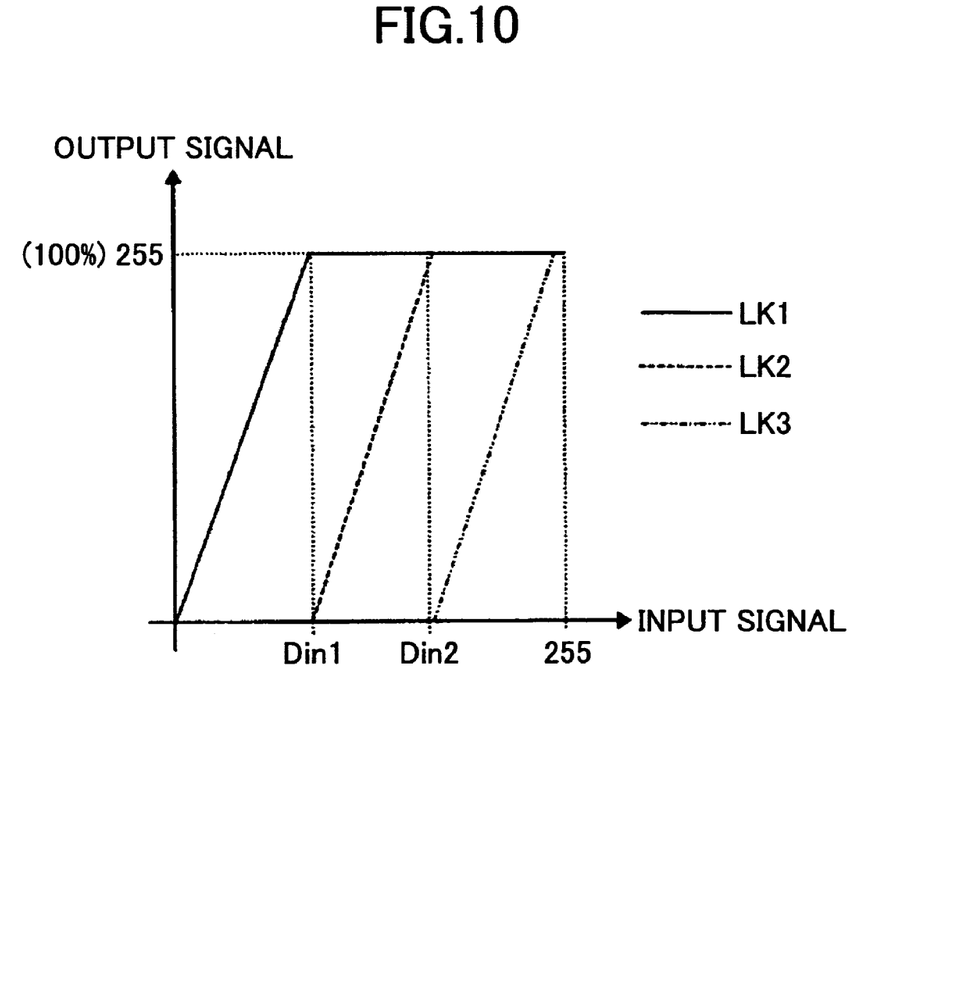
FIG. 10 is a schematic diagram showing a distribution table.
Figure 11:
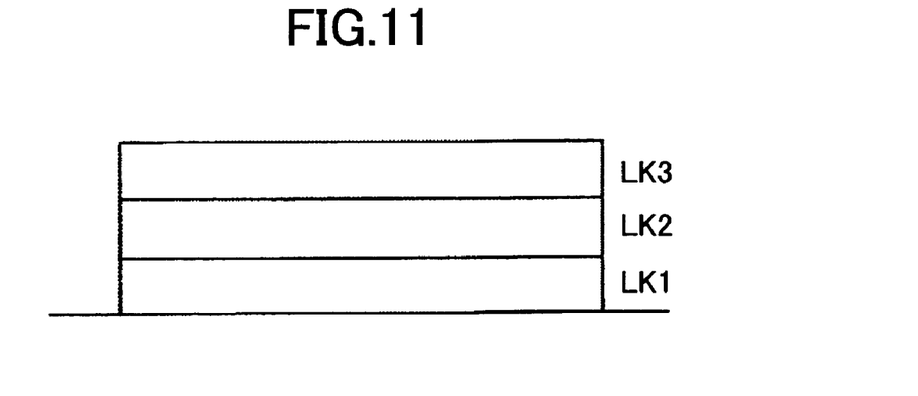
FIG. 11 is a diagram showing coloring materials Lk1, Lk2, and Lk3 superposed on a recording medium.

FIG. 10 is a schematic diagram showing a distribution table stored in the BkLk distribution unit 5 shown in FIG. 1. FIG. 11 is a diagram showing superposition of Lk1, Lk2, and Lk3 on a recording medium. Upon distributing K data, the distribution table stored in the BkLk distribution unit 5 (refer to FIG. 1) is used and Lk1, Lk2, and Lk3 data (Lk1 is the lightest coloring material followed by Lk2 and Lk3 successively) is generated from the K data. The distribution table, as shown in FIG. 10, stores output signals of the Lk1, Lk2, and Lk3 data corresponding to values of the K data (input signals) input to the BkLk distribution unit 5, where the K data is generated in the black color generating unit 4.

When the distribution table of FIG. 10 is used, the values of K data to be input are recorded up to Din1 using only those Lk1 dots. In other words, the coloring materials are recorded from a start of the input signal values up to Din1 using only those Lk1 dots, so that the coloring materials are recorded in a recording material using only those output signal values Lk1 (100% of solid Lk1) up to the input signal values Din1. Next, when the input signal values range from not less than Din1 to not more than Din2, the percentage of Lk1 dots is 100% (numeral 255 in the figure indicates 100%) and Lk2 dots are recorded at a recording percentage of monotone increasing from 0% to 100%. In other words, when the input signal values range from not less than Din1 to not more than Din2, two types of coloring material are used for recording on the recording medium.

When the input signal values range from Din1 to 255, 100% of Lk1 is recorded. From the input signal values greater than Din1, the coloring material Lk2 is recorded on the coloring material Lk1, Lk2 being dark next to Lk1 and having transparency higher than that of Lk1. Lk2 is recorded from Din1 with monotone increasing and 100% of Lk2 is recorded at Din2. In other words, at Din2, a total of 200% of coloring materials are recorded in which 100% of both Lk1 and Lk2 are used.

Also, when the values of K data are not less than Din2, on the 100% of the recorded Lk1 and Lk2 dots, Lk3 dots are recorded at a recording percentage of monotone increasing from 0% to 100%. In other words, when the input signal values are not less than Din2, three types of coloring material are used for recording on the recording medium. Thus, when the input signal values are not less than Din2, superposition on the recording medium is performed as shown in FIG. 11.

In this case, as shown in FIG. 9, if transparency is set as Lk1<Lk2<Lk3, a layer of coloring material with a high non-transparency and a low density is formed at a bottom layer, so that light is unlikely to pass through the layer to reach the recording medium. Further, as shown in FIG. 9, by setting the density of the coloring materials as Lk1<Lk2<Lk3, a percentage of area is increased in the Lk1 layer with the lowest density of the coloring material, so that an influence of the recording medium is unlikely to be caused.

A highlight area where the input values of K data are small is formed using a light coloring material with a low density, so that granularity is not deteriorated and the density of coloring materials superposed as upper layers becomes high as the input values of the K data are increased. Thus, it is possible to reproduce a high image density while maintaining the granularity. As a result, it is possible to obtain a good granularity in the entire range of gradation.

Next, as a second embodiment, the following describes another example of distribution in which the total amount controlling value in the total amount control unit 6 of FIG. 1 is 200% and three types of dark and light coloring materials are used. Other image processing is the same as in the first embodiment.

Figure 12:
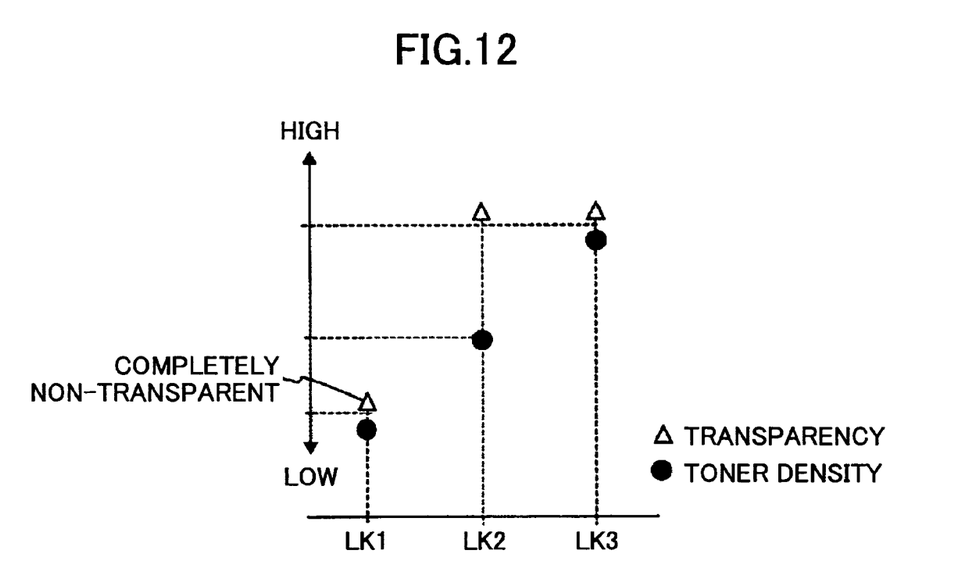
FIG. 12 is a diagram showing a relationship between transparency and density of each coloring material.
Figure 13:
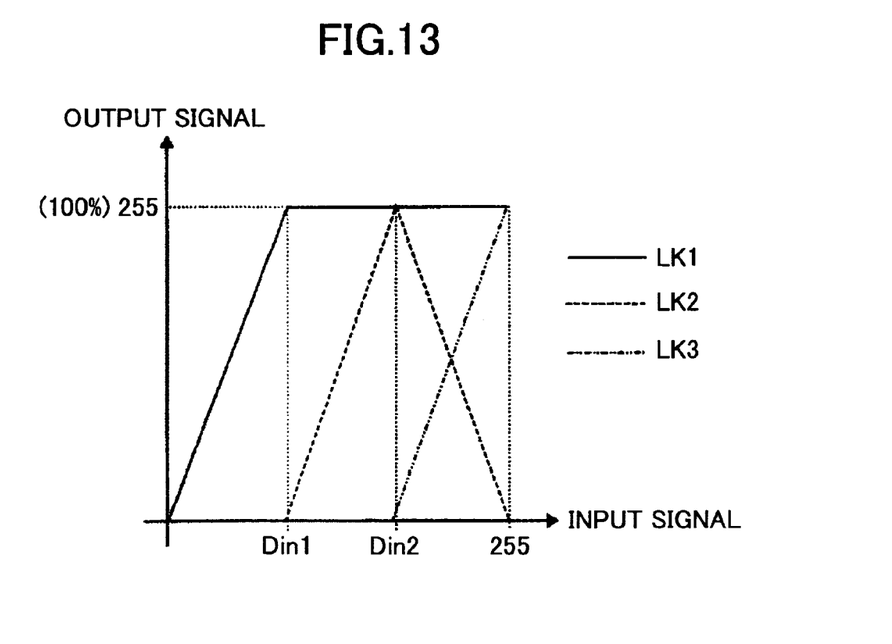
FIG. 13 is a diagram showing a distribution table.

FIG. 12 is a diagram showing a relationship between the transparency and the density of each coloring material. FIG. 13 is a diagram showing a distribution table. In this case, the three types of dark and light coloring materials are represented as Lk1, Lk2, and Lk3 from the lightest coloring material. Further, the relationship between the transparency and the density of each coloring material is shown in FIG. 12. In FIG. 12, Lk1 is a completely non-transparent coloring material with a low transparency and a low density of coloring material.

In accordance with the distribution table, when input signal values as K data values are not more than Din1, recording is performed using only those Lk1 dots. When the input signal values as K data values range from Din1 to Din2, on 100% of the recorded Lk1 dots, Lk2 dots are recorded at a recording percentage of monotone increasing from 0% to 100%. Further, when the K data values are at Din2, 100% of both Lk1 dots and Lk2 dots are recorded.

When the k data values are not less than Din2, on the 100% of the recorded Lk1 dots, Lk2 dots are recorded at a recording percentage of monotone decreasing from 100% to 0% and Lk3 dots are recorded at a recording percentage of monotone increasing from 0% to 100%.

In other words, in the present embodiment, only Lk1 is completely non-transparent and other Lk2 and Lk3 are transparent. In accordance with this, an incident light passes through all the layers with a high transparency except the bottom layer, so that an effect of superposition is greater, and it is possible to obtain a range of gradation of shadows in an efficient manner even when the total amount controlling value is high.

Further, in the present embodiment, the bottom layer is completely non-transparent and thus an effect of the recording medium is completely eliminated. Thus, the present embodiment is suitable when a status of the recording medium is not good for image forming, namely, when the recording medium is tinted, for example. In this manner, coloring materials are switched for higher density as an area of shadow portions is increased, so that it is possible to obtain high-quality images regardless of the limitation of the total amount of coloring materials.

As a third embodiment, the following describes another example of distribution in which the total amount controlling value in the total amount control unit 6 of FIG. 1 is 100% and four types of dark and light coloring materials are used. Other image processing is the same as in the first embodiment.

Figure 14:
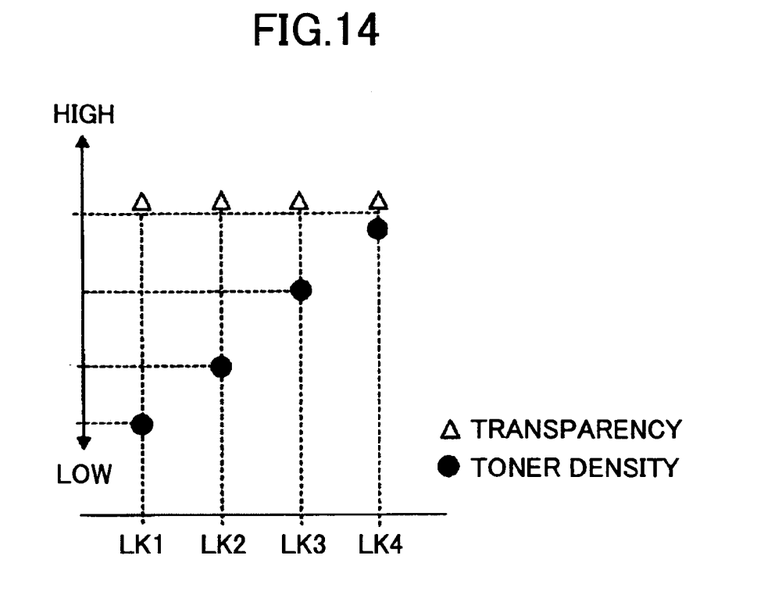
FIG. 14 is a diagram showing a relationship between transparency and density of each coloring material.
Figure 15:
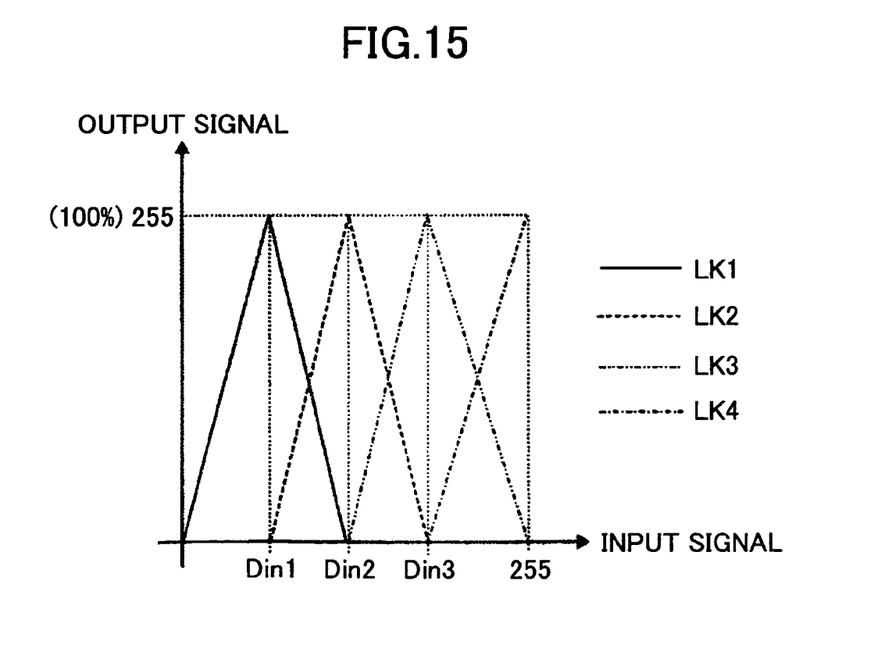
FIG. 15 is a diagram showing a distribution table.

FIG. 14 is a diagram showing a relationship between the transparency and the density of each coloring material. FIG. 15 is a diagram showing the distribution table. In this case the four types of coloring materials are represented as Lk1, Lk2, Lk3, and Lk4 from the lightest coloring material. Further, as shown in the relationship between the transparency and the density of each coloring material of FIG. 14, all the coloring materials have a high transparency. In FIG. 15, the distribution table for the four types of coloring materials is shown.

In accordance with the distribution table, when the input signal values as K data values are not more than Din1, recording is performed using only those Lk1 dots. When the input signal values as K data values range from Din1 to Din2, the Lk1 dots are recorded at a recording percentage of monotone decreasing from 100% to 0% and Lk2 dots are recorded at a recording percentage of monotone increasing from 0% to 100%.

When the input signal values as K data values are at Din2, 0% of the Lk1 dots are recorded and 100% of the Lk2 dots are recorded. Next, when the input signal values as K data values range from Din2 to Din3, the Lk2 dots are recorded at a recording percentage of monotone decreasing from 100% to 0% and Lk3 dots are recorded at a recording percentage of monotone increasing from 0% to 100%.

When the input signal values as K data values are at Din3, 0% of the Lk2 dots are recorded and 100% of the Lk3 dots are recorded. When the input signal values as K data values are not less than Din3, the Lk3 dots are recorded at a recording percentage of monotone decreasing from 100% to 0% and Lk4 dots are recorded at a recording percentage of monotone increasing from 0% to 100%.

In other words, in the present embodiment, two types of coloring materials are always used for recording, the coloring materials having density close to each other which is close to an output density, so that granularity is substantially good. Further, in the present embodiment, an effect of a recording medium is not eliminated, so that the present embodiment is suitable for a case where a status of the recording medium is good for printing, namely, brightness (white point) of the recording medium is high, for example.

Next, the following describes an embodiment for controlling transparency of the bottom layer depending on dispersion of reflectance in paper. Distribution and other image processing are the same as in the first to third embodiments.

If there is dispersion of reflectance depending on positions of the recording medium, when a coloring material having transparency is placed, the coloring material is affected in accordance with the reflectance of the recording medium and granularity of the coloring material is deteriorated. Thus, the dispersion of reflectance of the recording medium is examined. If the examined dispersion is large, a non-transparent coloring material having a screening capability is disposed at the bottom layer so as to eliminate the effect of the recording medium.

Figure 16:
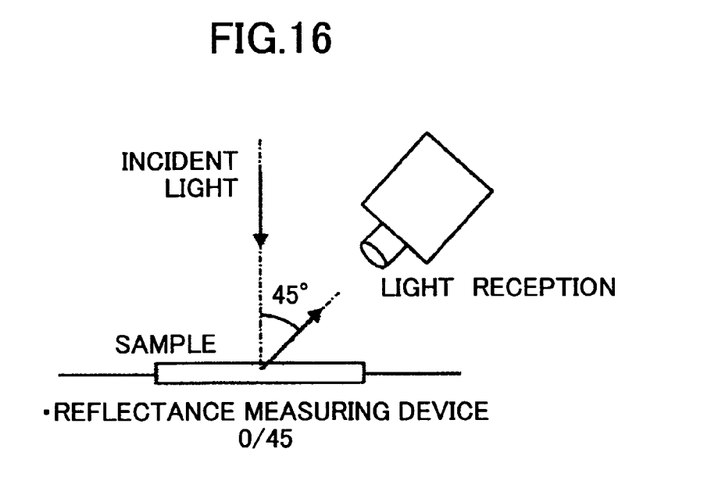
FIG. 16 is a schematic diagram showing a reflectance measuring device for measuring dispersion of reflectance.

FIG. 16 is a schematic diagram showing a reflectance measuring device for measuring the dispersion of reflectance. As shown in FIG. 16, the reflectance of the recording medium is measured using the reflectance measuring device such that an incident light is applied to a paper sample and the incident light is received using an optical receiver. In this case, the measurement is performed at several positions of the recording medium. A structure of the reflectance measuring device does not directly relate to the present invention and is used merely for describing the measurement of the dispersion.

Figure 17:
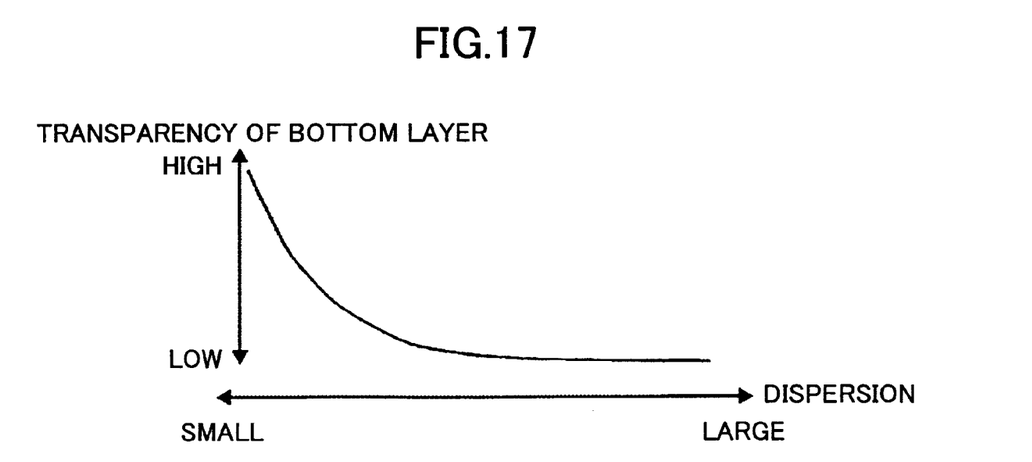
FIG. 17 is a diagram showing a relationship between a level of transparency and a degree of dispersion in a bottom layer.

FIG. 17 is a diagram showing a relationship between a level of transparency and a degree of dispersion in the bottom layer. Although a structure of controlling is not shown in the drawings, in practice, the controlling is performed such that the transparency of the bottom layer is set to be lower as the dispersion of the reflectance increases as shown in FIG. 17. The dispersion may be determined based on dispersion or a half-width in each position.

In the present embodiment where the transparency of the bottom layer is controlled to be lower depending on the degree of the dispersion of reflectance, preferably, the coloring material having a high screening capability is always used at the bottom layer. Thus, the distribution is preferably performed as shown in FIG. 10 or FIG. 13 and the distribution as shown in FIG. 15 is not preferable.

Lastly, the following describes an embodiment for controlling an amount of attachment depending on smoothness and luster of the recording medium, namely, the total amount controlling value in the total amount control unit 6 of FIG. 1. Distribution and other image processing are the same as in the first to third embodiments.

When the coloring material is placed on the surface of the recording medium, if the surface of the recording medium is coarse, the coloring material is permeated into fibers of the recording medium, for example, so that it is impossible to obtain a smooth surface of the coloring material or luster. As a result, it is impossible to realize a broad range of gradation. In view of this, the total controlling value is controlled in accordance with the status of the surface of the recording medium.

In practice, as shown in FIG. 7, the control is performed such that the total controlling value is set higher as a level of the luster of the recording medium is lower and the surface is courser so that a larger amount of the coloring material is placed on the surface of the recording material. In this embodiment, the luster is related with the surface of the coloring material, so that it is possible to control the transparency of the coloring material using other factors such as a tint of the recording medium, or the like. Since it is possible to control a total amount of the coloring material in accordance with the luster of the recording medium, it is possible to obtain a high-quality image regardless of the smoothness or luster of the recording medium.

Although the embodiments of the present invention are described based on the black color, other color may naturally be used to make the present invention.

The present invention is not limited to the specifically disclosed embodiment, and variations and modifications may be made without departing from the scope of the present invention.

What is claimed is:

1. An image forming apparatus comprising:
an input unit to input image data;
a conversion unit to convert the image data to conversion data on a plurality of colors for forming an image on a recording medium; and
an image forming unit to form an image of the conversion data on the recording medium using a plurality of colors of coloring materials, wherein
the image is formed on the recording medium by the image forming unit using at least three types of black coloring materials having transparency and density different to one another in accordance with the conversion data on a black color upon conversion to the conversion data on plural colors, and transparency of the black coloring materials is lower as density of the black coloring materials is lower.

2. The image forming apparatus according to claim 1, wherein
a level of transparency is similar between the black coloring materials having least difference of density.

3. The image forming apparatus according to claim 1, wherein
the image forming unit records a coloring material having a lower transparency at a bottom layer on the recording medium.

4. The image forming apparatus according to claim 1, wherein
the conversion unit uses a coloring material having a low transparency and density for a highlight portion of an image and switches to a coloring material having a high transparency and density as a shadow portion of the image increases.

5. An image forming method comprising:
inputting image data;
converting the image data to conversion data on a plurality of colors for forming an image on a recording medium; and
forming an image of the conversion data on the recording medium using a plurality of colors of coloring materials, wherein
the image is formed on the recording medium using at least three types of black coloring materials having transparency and density different to one another in accordance with the conversion data on a black color upon conversion to the conversion data on plural colors, and transparency of the black coloring materials is lower as density of the black coloring materials is lower.

6. The image forming method according to claim 5, wherein
a level of transparency is similar between the black coloring materials having least difference of density.

7. The image forming method according to claim 5, wherein
a coloring material having a lower transparency is used for image forming at a bottom layer on the recording medium.

8. The image forming method according to claim 5, further including:
performing conversion to conversion data on plural colors to use a coloring material having a low transparency and density for a highlight portion of an image and to use a coloring material having a high transparency and density as a shadow portion of the image increases.

9. An image forming apparatus comprising:
an input unit to input image data;
a conversion unit to convert the image data to conversion data on a plurality of colors for forming an image on a recording medium; and
an image forming unit to form an image of the conversion data on the recording medium using a plurality of colors of coloring materials, wherein
the image is formed on the recording medium by the image forming unit using at least three types of coloring materials of a predetermined color having transparency and density different to one another in accordance with the conversion data on a predetermined color upon conversion to the conversion data on plural colors, and
transparency of the coloring materials of a predetermined color is lower as density of the coloring materials of a predetermined color is lower.

* * * * *